United States Patent Office 2,977,370
Patented Mar. 28, 1961

2,977,370

PRODUCTION OF 2-OXAZOLIDONES

Aaron Oken, Kennett Township, Chester County, Pa., assignor to E. I. du Pont de Nemours and Company, Wilmington, Del., a corporation of Delaware No Drawing. Filed Apr. 13, 1959, Ser. No. 805,670

3 Claims. (Cl. 260—307)

This invention relates to a process for preparing 2-oxazolidones and more particularly to a process for preparing 2-oxazolidones from epoxides and organic isocyanates or their dimers, the 1,3-diazacyclobutane-2,4-diones.

It is an object of the present invention to provide a process for preparing 2-oxazolidones. A further object is to provide a process for preparing 2-oxazolidones from epoxides and organic isocyanates or their dimers, the 1,3-diazacyclobutane-2,4-diones. Other objects will appear hereinafter.

These and other objects of this invention are accomplished by the process comprising heating a mixture of an organic isocyanate or its dimer, the 1,3-diazacyclobutane-2,4-dione with an epoxide and recovering the 2-oxazolidone thereby obtained.

The organic isocyanates which are used in the process of this invention may be represented by the formula R—NCO, wherein R is an organic radical which is free of epoxide reactable groups, such as an aliphatic, aromatic, mixed aliphatic-aromatic radical or an organic polymer radical. Representative organic isocyanates include methyl isocyanate, chloromethylisocyanate, ethyl isocyanate, β-chloroethylisocyanate, butylisocyanate, tert-butylisocyanate, octylisocyanate, octadecylisocyanate, cyclopentylisocyanate, cyclohexylisocyanate, 2,5-dimethylcyclohexylisocyanate, 2-methoxycyclohexylisocyanate, allylisocyanate, pentenylisocyanate, phenylisocyanate, p-chlorophenylisocyanate, o-tolylisocyanate, m-nitrophenylisocyanate, m-bromophenylisocyanate, p-methoxyphenylisocyanate, p-carbomethoxyphenylisocyanate, 4-biphenylisocyanate, p-dimethylaminophenylisocyanate, 4-ethyl-6-nitro-o-tolylisocyanate, m-fluorophenylisocyanate, 2,3,5,6-durylisocyanate, 2,4,6-mesitylisocyanate, 1-naphthylisocyanate, 2-naphthylisocyanate, 5-nitro-1-naphthylisocyanate, 4(4-pentenyl)-phenylisocyanate, 3-isocyanatopyrene, benzylisocyanate, 3-chlorobenzylisocyanate, and 4-ethoxybenzylisocyanate. The isocyanate-terminated polymers include polyethers, polyesters, polyformals, poly-N-alkyl substituted amides, polyester-N-alkyl substituted amides, poly-N-alkyl substituted ureas, poly-N-alkyl substituted urethanes, polyaldehydes and polycarbonates. It is preferred that these polymers have molecular weights below 10,000. In general any organic isocyanate may be used so long as the organic radical is free of any epoxide reactive groups. Such groups include all groups bearing hydrogen atoms which are active as determined by the Zerewitinoff test, i.e., such groups as acetamido, acetimido, amino, amido, carbamyl, carboxyl, diazoamino, hydrazino, hydrazo, hydrazono, hydroxamino, hydroxyl (alcoholic, phenolic), imido, imino, isonitro, isonitroso, mercapto, nitroamino, oxamyl, phosphinico, phosphino, phosphono, selenino, selenono, selenyl, silicono, stibinico, stibino, stibono, stibylene, sulfamino, sulfamyl, sulfino, sulfo, thiocarbamyl, triazeno, ureido, ureylene, and urethaneo.

It is to be understood that when mixtures of isocyanates are used a product mixture of all the possible 3-substituted-2-oxazolidones may be formed. Mixtures of epoxides in like manner lead to mixed 2-oxazolidones.

In place of the organic isocyanates one may use the corresponding dimers which are called 1,3-diazacyclobutane-2,4-diones and have the structure

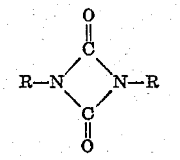

wherein R is as defined above. The R's need not be the same. Representative isocyanate dimers include: 1,3-bis(4-ethoxyphenyl)-1,3-diazacyclobutane-2,4-dione, 1,3-bis(m-tolyl)-1,3-diazacyclobutane-2,4-dione, 1,3-diphenyl-1,3-diazacyclobutane-2,4-dione, 1,3-bis(3-chlorophenyl)-1,3-diazacyclobutane-2,4-dione, 1,3-bis(4-biphenyl)-1,3-diazacyclobutane-2,4-dione, 1,3-bis(4-bromophenyl)-1,3-diazacyclobutane-2,4-dione, 1,3-dinaphthyl-1,3-diazacyclobutane-2,4-dione and 1,3-pyrenyl-1,3-diazacyclobutane-2,4-dione. Under the conditions of the subject process, these dimers dissociate to provide the parent organic isocyanate R—NCO, or isocyanates, when the R's are different. The dimers are prepared by contacting organic isocyanates with certain catalysts such as trialkyl phosphines, pyridine, or triethylamine.

The epoxides which are used in the process of this invention may be represented by the formula

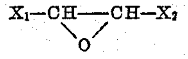

wherein $X_1$ and $X_2$ are hydrogen or organic radicals which are free of epoxide reactive groups. It is to be understood that $X_1$ and $X_2$ need not necessarily be the same in each compound. $X_1$ and $X_2$ may be joined together to form a cyclic epoxide. Representative epoxides include ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 3-chloro-1,2-epoxypropane, 1,2-epoxy-5-hexene, 1,2-epoxycyclohexane, 1,2-epoxy-2-cyclohexylethane, 1,2-epoxy-2-cyclohexylpropane and 1,2-epoxy-3-butene.

In carrying out the process of this invention, the epoxide is heated with the organic isocyanate or dimer and the resulting 2-oxazolidone then recovered. The reaction must be carried out at a temperature of from about 220° to 250° C. for a period of time of from about 1 to about 5 hours.

It is preferred that approximately stoichiometric proportions of the reactants be used, i.e., about one molecule of epoxide be supplied for every molecule of the isocyanate reactant and when the dimer is used, about 2 molecules of epoxide be supplied per mole of dimer. The use of less epoxide results in a decreased yield of 2-oxazolidone. Excess epoxide may be used, such as about 2 to 4 molecules per mole of isocyanate monomer or dimer, respectively; however more than this amount may cause undesired side reactions.

The process of this invention may be carried out at atmospheric pressure provided the vapor pressure of the mixture of reactants is low enough. Often the reactants, particularly the epoxides, are too volatile in which event the reaction is conducted at superatmospheric pressure. Such a reaction may be carried out in an autoclave or rocker bomb. In general, the reactor will have an inert lining such as glass, enamel, stainless steel or lead. It is not necessary to use any higher pressure than that exerted by the reaction mixture at the operating temperature. When the formation of the 2-oxazolidone consumes a more volatile reactant, the drop in pressure may be used to follow the progress of the reaction.

In general the reactants are mixed at temperatures below about 150° C. and brought to the operating temperature by application of external heat. If the reactants are heated too rapidly, the reaction may get out of control. A rapid temperature rise will occur and undesired by-products will be formed. If desired, the reactants may be heated separately to the desired operating temperature and then slowly introduced in stoichiometric proportions into an agitated reactor at the reaction temperature.

When the process is conducted at atmospheric pressure, analysis of the products obtained from trial runs will be required to determine the time needed to complete the reaction. When a superatmospheric process is operated, the end of the reaction is usually indicated by a halt in the pressure drop. In any event, the reaction vessel is allowed to cool until it can be opened conveniently. The 2-oxazolidone obtained is purified by conventional techniques of fractional distillation and recrystallization. For example, 3-phenyl-2-oxazolidone is conveniently recovered by contacting the reaction mixture with hot tetrahydrofuran. The oxazolidone dissolves and the addition of n-hexane to the filtrate precipitates the oxazolidone which is finally recrystallized from a mixture of n-hexane and tetrahydrofuran.

The process of the present invention for preparing 2-oxazolidones may also be used to prepare 2-imidazolidones since it has been determined that this cyclic urea is obtained as a by-product. Thus, when the monomeric isocyanate or dimer is heated with the epoxide at temperatures of from about 220° to 250° C. a 2-oxazolidone is obtained as well as a 2-imidazolidone. More specifically, when phenyl isocyanate is reacted with ethylene oxide the products obtained are 3-phenyl-2-oxazolidone and 1,3-diphenyl-2-imidazolidone. It is quite apparent that the cyclic urea obtained as a by-product will be determined by the specific isocyanate reactant and epoxide being used.

The 2-oxazolidones, which are prepared by the process of this invention, may be defined by the formula

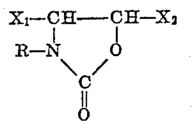

wherein R, $X_1$ and $X_2$ are as defined above. These 2-oxazolidones are useful as solvents and plasticizers for cellulose esters and acrylic polymers. The 2-imidazolidones, which are obtained as a by-product in the process of this invention, may be defined by the formula

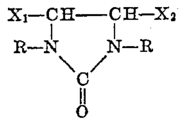

wherein R, $X_1$ and $X_2$ are as defined above. These 2-imidazolidones are useful as intermediates in that they may be hydrolyzed to form secondary diamines. They may be reduced and are then useful as fume-fading agents for dyed cellulose acetate.

The following examples will better illustrate the nature of the present invention; however, the invention is not intended to be limited to these examples. Parts are by weight unless otherwise indicated.

*Example 1*

A mixture consisting of 120 grams of phenyl isocyanate and 75 grams of ethylene oxide was placed in a 400-cc. stainless steel bomb at room temperature. Heat was applied and the temperature was slowly raised. At 210–215° C. a violent reaction occurred and the temperature rose to 254° C.; after a sudden surge, the pressure fell rapidly to zero. The bomb was subsequently kept at 225–230° C. for 4 hours. On cooling, 186 grams of light brown solid was removed which was recrystallized from a mixture of tetrahydrofuran and n-hexane to yield 109 grams of 3-phenyl-2-oxazolidone melting at 116° C. Its infrared spectrum was identical with that of an authentic specimen of 3-phenyl-2-oxazolidone.

*Example 2*

A mixture consisting of 120 grams of phenyl isocyanate and 50 grams of ethylene oxide was heated for 4 hours at 230° C. in a 400-cc. stainless steel bomb. On cooling, 162 grams of light brown solid was obtained; extraction of this product with 400 ml. of refluxing tetrahydrofuran left 38 grams of residue which was identified as 1,3-diphenyl-2-imidazolidone.

*Analysis.*—Calcd. for $C_{15}H_{14}N_2O$: C, 75.6; H, 5.9; N, 11.7. Found: C, 75.4; H, 5.7; N, 11.6.

It melted at 216° C. (undepressed by admixture with an authentic specimen). The tetrahydrofuran solution on admixture with n-hexane deposited 122 grams of 3-phenyl-2-oxazolidone.

*Example 3*

100 grams of propylene oxide was substituted for 50 grams of ethylene oxide in the procedure of Example 2. After the bomb was cooled, 200 grams of a viscous black liquid was removed. 53 grams of (4-or 5-)methyl-3-phenyl-2-oxazolidone was obtained by fractional distillation. Recrystallization from mixed tetrahydrofuran and n-hexane gave 36 grams melting at 81–83° C.

*Analysis.*—Calcd. for $H_{10}H_{11}O_2N$: C, 67.8; H, 6.2; N, 7.9. Found: C, 68.2; H, 6.4; N, 7.9.

*Example 4*

35 grams of ethyl isocyanate and 25 grams of ethylene oxide were agitated in a 400-cc. stainless steel bomb at 230° C. for 4 hours. After cooling, 56 grams of a mixture of solid and liquid material was removed and filtered through sintered glass. The liquid product was fractionally distilled to yield 26 grams of 3-ethyl-2-oxazolidone boiling at 65–68° C. (0.15 mm. Hg).

*Example 5*

48 grams of phenyl isocyanate and 38 grams of ethylene oxide were reacted at about 220° C. for 2 hours in a bomb. After cooling, 68 grams of a waxy tar was removed which was insoluble in water, partly soluble in ether, and soluble in acetone. The tar was recrystallized from chloroform-ethyl ether mixture and then from chloroform-carbon tetrachloride mixture. The white flakes obtained melted at 118–122° C. and analyzed for 3-phenyl-2-oxazolidone:

Calcd. for $C_9H_9O_2N$: C, 66.3; H, 5.5; N, 8.6. Found: C, 66.5; H, 5.5; N, 8.4.

There was no depression in the melting point when the above product was mixed with an authentic sample of 3-phenyl-2-oxazolidone.

As many widely different embodiments of this invention may be made without departing from the spirit and scope thereof, it is to be understood that this invention is not limited to the specific embodiments thereof except as defined in the appended claims.

What is claimed is:

1. A process for preparing a 2-oxazolidone which comprises heating to a temperature of from about 220° C. to 250° C. a mixture consisting of approximately stoichiometric proportions of (*a*) an epoxide selected from the group consisting of ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 3-chloro - 1,2 - epoxypropane, 1,2-epoxy-5-hexene, 1,2-epoxycyclohexane, 1,2-epoxy - 2 - cyclohexylethane, 1,2-epoxy - 2 - cyclohexylpropane and 1,2-epoxy-3-butene, and (*b*) a compound selected from the group consisting of an organic isocyanate of the formula R—NCO and a 1,3-diazacyclobutane-2,4-dione of the formula

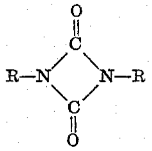

wherein R is an organic radical selected from the group consisting of alkyl radicals, haloalkyl radicals, cycloalkyl radicals, alkyl-substituted cycloalkyl radicals, alkoxy-substituted cycloalkyl radicals, alkenyl radicals, hydrocarbon aryl radicals, nitro-substituted hydrocarbon aryl radicals, halogen-substituted hydrocarbon aryl radicals, alkoxy-substituted hydrocarbon aryl radicals, carboalkoxy-substituted hydrocarbon aryl radicals, aminoalkyl-substituted hydrocarbon aryl radicals, and alkenyl-substituted hydrocarbon aryl radicals; and recovering the 2-oxazolidone thereby obtained.

2. A process according to claim 1 wherein a 2-imidazolidone is obtained in addition to the 2-oxazolidone.

3. A process for preparing 3-phenyl-2-oxazolidone and 1,3-diphenyl-2-imidazolidone which comprises heating about one mole of phenylisocyanate and about one mole of ethylene oxide to a temperature of about 230° C. for a period of time of about 4 hours.

References Cited in the file of this patent

UNITED STATES PATENTS

| | | |
|---|---|---|
| 2,594,979 | Nelson | Apr. 29, 1952 |
| 2,602,075 | Carpenter et al. | July 1, 1952 |
| 2,788,335 | Barthel | Apr. 9, 1957 |
| 2,799,663 | Hampton et al. | July 16, 1957 |
| 2,865,926 | Harrington | Dec. 23, 1958 |

FOREIGN PATENTS

| | | |
|---|---|---|
| 870,471 | France | Dec. 12, 1941 |

OTHER REFERENCES

Thomsen: Ber. deut. Chem., vol. 11, pp. 2136–2137 (1878).

Krasuskii et al.: Chem. Abstracts, vol. 31, col. 1377 (1937).

Elderfield: "Heterocyclic Compounds," vol. 5, pp. 397–8 (1957).